US012702531B2

(12) United States Patent
Taylor

(10) Patent No.: US 12,702,531 B2
(45) Date of Patent: Aug. 11, 2026

(54) CONTROLLING A PUMP DURING OPERATION OF AN ORAL CARE DEVICE

(71) Applicant: Fresh Health Inc., Mountain View, CA (US)

(72) Inventor: Machiko Taylor, Alameda, CA (US)

(73) Assignee: Fresh Health Inc., Mountain View, CA (US)

( * ) Notice: Subject to any disclaimer, the term of this patent is extended or adjusted under 35 U.S.C. 154(b) by 0 days.

(21) Appl. No.: 18/988,188

(22) Filed: Dec. 19, 2024

(65) Prior Publication Data

US 2026/0174536 A1 Jun. 25, 2026

(51) Int. Cl.
*A61C 17/02* (2006.01)
*A61C 17/024* (2006.01)

(52) U.S. Cl.
CPC ........ *A61C 17/0211* (2013.01); *A61C 17/024* (2019.05)

(58) Field of Classification Search
CPC . A61C 17/0211; A61C 17/02; A61C 17/0202; A61C 17/0205; A61C 17/0208; A61C 17/024; A61C 17/028; A61C 17/032; A61C 17/10; A61C 17/12; A61C 17/125; A61C 17/13; A61C 17/135
See application file for complete search history.

(56) References Cited

U.S. PATENT DOCUMENTS

| | | | | |
|---|---|---|---|---|
| 11,980,516 | B1 * | 5/2024 | Krieg | A61C 19/04 |
| 11,992,379 | B1 * | 5/2024 | Schena | A61C 17/36 |
| 2014/0272782 | A1 * | 9/2014 | Luettgen | A61H 13/005 433/80 |
| 2019/0159877 | A1 * | 5/2019 | Sanders | A61C 19/066 |
| 2019/0231499 | A1 * | 8/2019 | Laurent | A61C 17/0208 |
| 2021/0085436 | A1 * | 3/2021 | Evans | A61C 17/0211 |

* cited by examiner

*Primary Examiner* — Joseph D. Boecker
*Assistant Examiner* — Brian T Khong
(74) *Attorney, Agent, or Firm* — Van Pelt, Yi & James LLP

(57) ABSTRACT

An oral care device includes an oral insert, a pump, a fluid reservoir, and a controller. The controller provides a control signal having a duty cycle to the pump in response to an actuator being engaged. Response to the control signal, the pump causes fluid to be provided from the fluid reservoir to the oral insert according to the duty cycle.

21 Claims, 15 Drawing Sheets

112
Oral Insert
224
Fluid Inlet Port
228
Manifolds
222
Fluid Nozzles
226
Fluid Output Port
230
Tray 108
Handle
236
Manifold Switching Mechanism
234
Controller
232
Actuator 104
Base Station
202
Fluid Pump
201
Sensor(s)

102
Fluid Reservoir
204
Check Intake Valve

CONTROLLING A PUMP DURING OPERATION OF AN ORAL CARE DEVICE

BACKGROUND OF THE INVENTION

An oral care device may include a fluid reservoir, a pump, and an oral insert. The oral insert includes a plurality of manifolds and a plurality of fluid nozzles. Fluid is introduced into the fluid reservoir. A user may insert the oral insert into their mouth and subsequently turn on the oral care device. When activated, the pump causes fluid to exit the fluid reservoir and to be directed towards the oral anatomy of the user via the plurality of manifolds and the plurality of fluid nozzles. The initial impact of the fluid causes debris and/or biofilm to be removed from the oral anatomy. However, as the user's mouth fills with water, the fluid's ability to remove debris and/or biofilm is reduced.

BRIEF DESCRIPTION OF THE DRAWINGS

Various embodiments of the invention are disclosed in the following detailed description and the accompanying drawings.

DETAILED DESCRIPTION

Figure 1A:
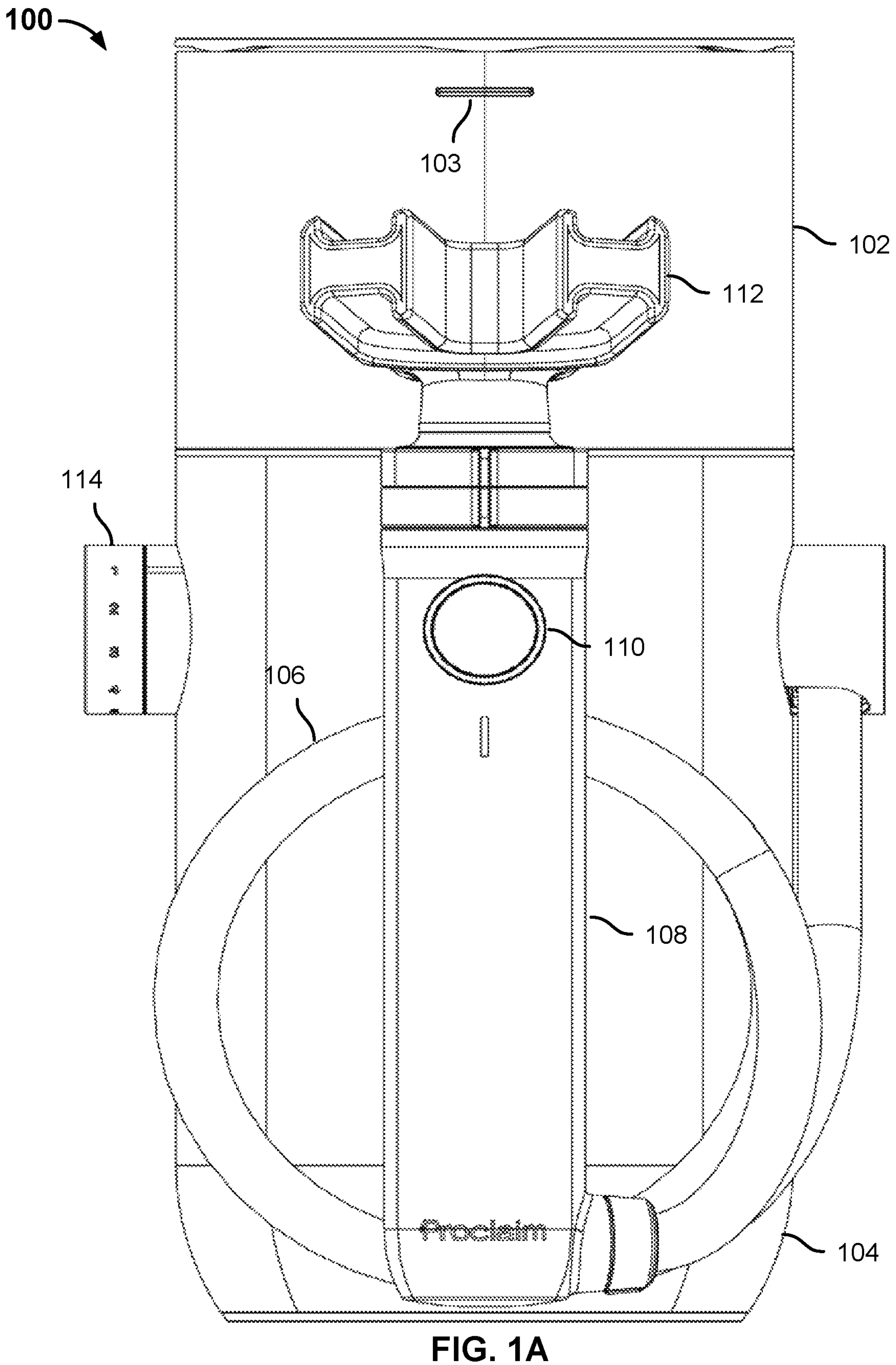
FIG. 1A is a front view of an oral care device in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and methods to improve the efficacy of an oral care device are disclosed. An oral care system includes a fluid reservoir, a base that includes a pump, a handle coupled to the base via a conduit, and an oral insert releasably attached to the handle. The handle includes a manifold disc that includes a plurality of holes and a manifold selector disc that includes an opening. The oral insert includes a plurality of manifolds, each manifold having a corresponding manifold opening. Each manifold disc hole of the manifold disc corresponds to one of the manifold openings of the oral insert.

A user provides fluid to the fluid reservoir. The handle or the base includes an actuator to active the oral care device. In response to a user input (e.g., pressing the button, sliding the button, etc.), a controller provides a control signal to turn the pump on, which causes fluid to be provided from the fluid reservoir to the oral insert via the handle. The handle includes a manifold switching mechanism. In some embodiments, the manifold switching mechanism includes a manifold selector disc that is coupled to a motor via a planetary gear system. A control signal from the controller activates the motor, causing the planetary gear system to rotate and, in turn, the manifold selector disc to rotate. In some embodiments, the manifold switching mechanism includes a manifold selector disc that is coupled to a turbine. Fluid enters the handle via the conduit and the fluid causes a turbine to rotate and, in turn, the manifold selector disc to rotate.

Figure 10A:
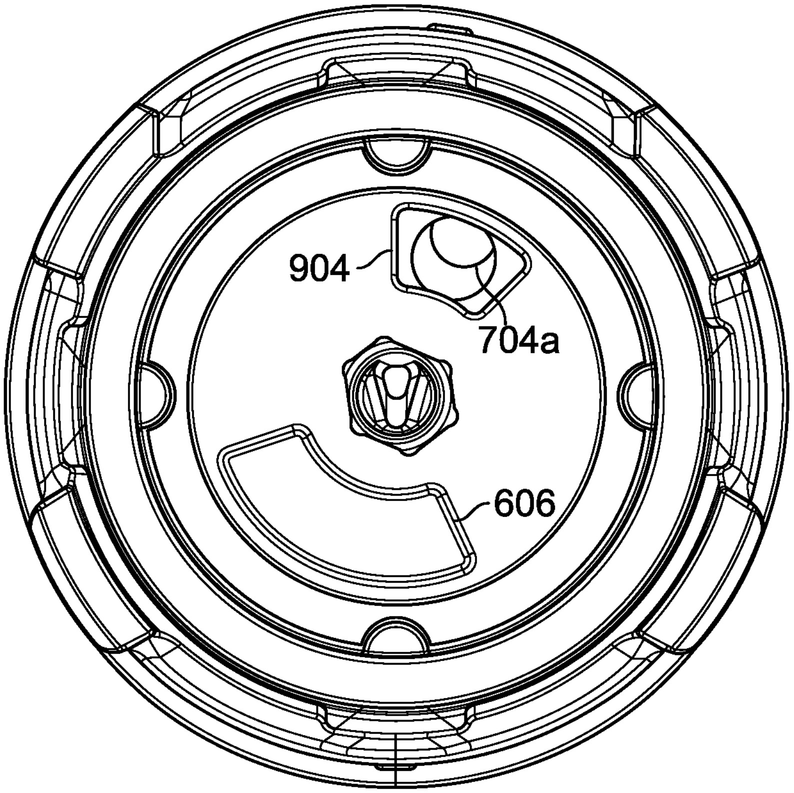
FIG. 10A illustrates a manifold selector disc in a first position in accordance with some embodiments.
Figure 10B:
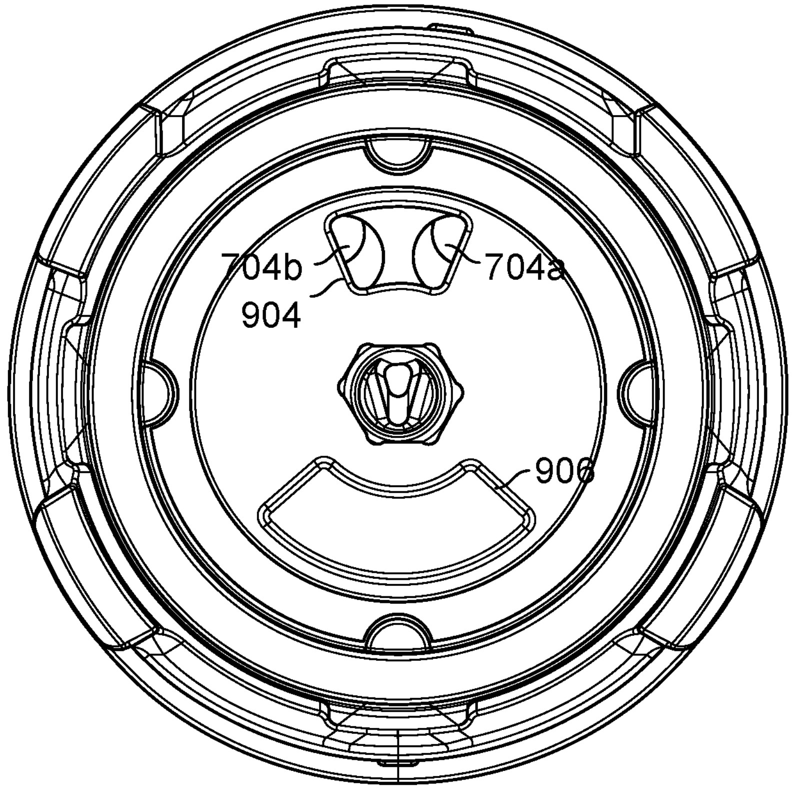
FIG. 10B illustrates a manifold selector disc transitioning from the first position to a second position in accordance with some embodiments.

As the manifold selector disc rotates, the opening of the manifold selector disc selects which manifold of the oral insert is to receive the fluid. When the manifold selector disc rotates, fluid is provided to one of the manifolds or split between two of the manifolds. As seen in FIG. 10A, the opening 904 allows fluid to be provided to hole 704*a* of the manifold disc, which corresponds to one of the oral insert manifolds. As seen in FIG. 10B, the opening 904 has rotated, which allows some of the fluid to be provided to hole 704*a* of the manifold disc and some of the fluid to be provided to hole 704*b* of the manifold disc. Fluid is provided to a first manifold of the oral insert manifolds and a second manifold of the oral insert manifolds.

Each manifold includes a plurality of fluid nozzles. Each manifold is associated with a different part of the user's oral anatomy. For example, a first manifold may provide fluid to the interior surfaces of the upper right molars via a first plurality of fluid nozzles and a second manifold may provide fluid to the exterior surface of the upper right molars via a second plurality of fluid nozzles. The initial impact of the fluid causes debris and/or biofilm to be removed from the user's teeth and gums. The fluid pressure of the fluid is at or near the maximum possible fluid pressure. However, as more fluid is provided, the user's mouth begins to fill up with the fluid. As a result, the fluid pressure of the currently provided fluid impacting the user's teeth and gums is reduced because it needs to travel through some portion of the previously provided fluid before reaching the user's teeth and gums. This reduces the fluid's ability to remove debris and/or biofilm.

To improve the efficacy of the oral care device, the oral insert includes an effluence conduit that allows the fluid to drain from the oral insert. While the fluid is draining from the oral insert, the pump is turned off a particular duration (e.g., 0.5 seconds) and then turned back on. The particular duration ensures the fluid is almost or completely removed from the oral insert. The manifold selector disc continues to rotate while the pump is turned off. When the pump turns back on, the fluid pressure of the fluid impacting the user's teeth and gums increases because it does not need to travel through fluid before reaching the user's teeth and gums. The pump is repeatedly turned on and off until the fluid reservoir is emptied or a particular amount of time elapses. This improves the efficacy of the oral care device because the fluid pressure of the fluid impacting the user's teeth and gums is maintained at a higher fluid pressure throughout a cleaning cycle when compared with the fluid pressure of the fluid impacting the user's teeth and gums when the pump is on the entire time during the cleaning cycle.

Figure 1B:
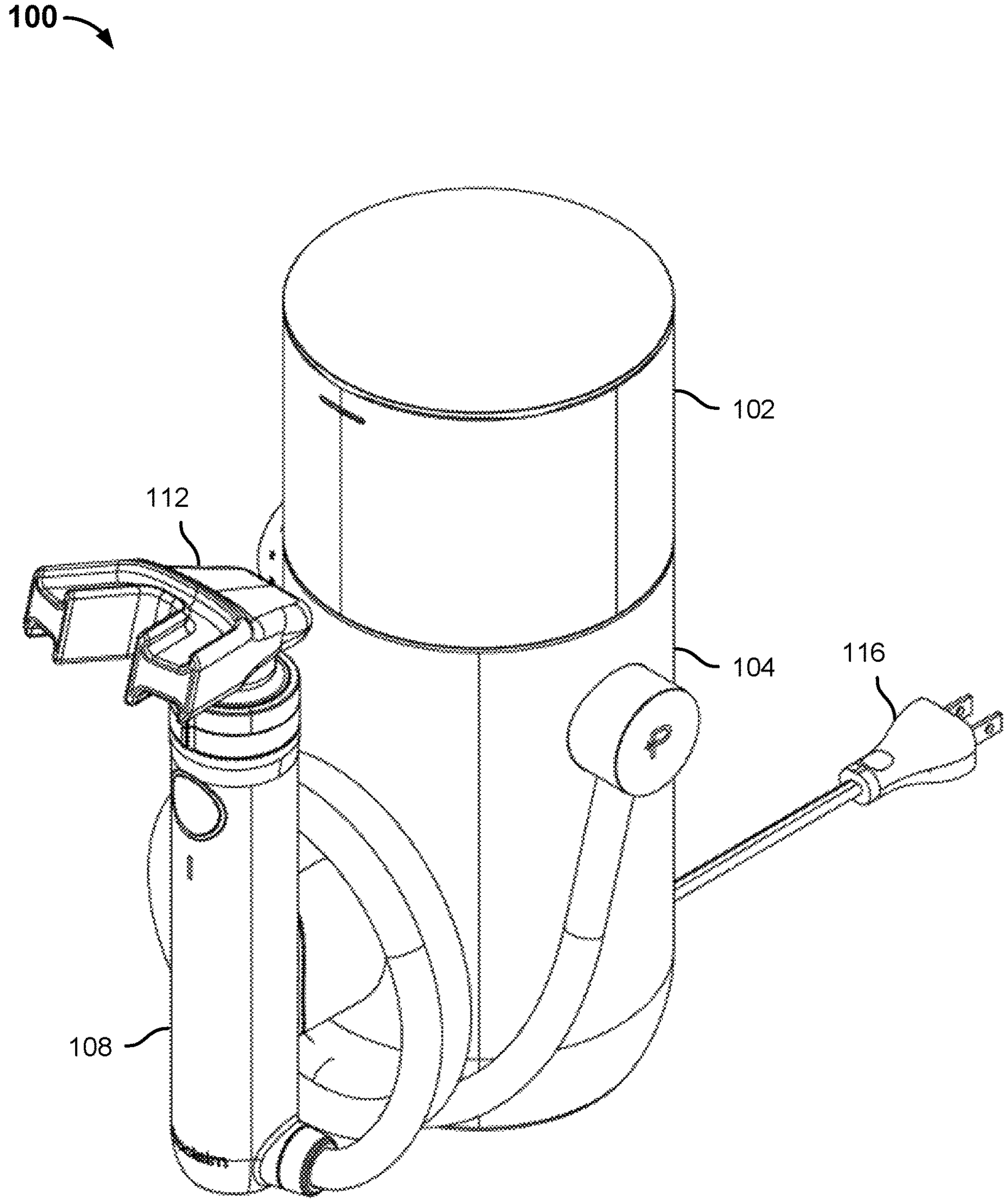
FIG. 1B is a perspective view of an oral care device in accordance with some embodiments.

FIG. 1A is a front view of an oral care device in accordance with some embodiments. FIG. 1B is a perspective view of an oral care device in accordance with some embodiments. In the example shown, oral care device 100 includes a reservoir 102, a base 104, a conduit 106, a handle 108 having an actuator 110, an oral insert 112, a flow control 114, and a plug 116. Reservoir 102 includes a marking 103 that indicates a particular amount of fluid that is to be deposited into reservoir 102 for a cleaning cycle. The fluid may be water, an antiseptic solution, a liquid medicant, flavored solutions, cleansing solutions, abrasive solutions, microbiome collection fluids, or a fluid that can have an impact on systemic health.

When actuator 110 is pressed, oral care device 100 (if plug 116 is plugged into an outlet) is activated. Fluid stored in fluid reservoir 102 is pumped from fluid reservoir 102 to conduit 106 via a pump located in base 104. The fluid then proceeds to handle 108 and subsequently to oral insert 112. The rate at which the fluid exits the plurality of fluid nozzles associated with oral insert 112 is controlled by flow control 114. A value of "1" is a "slow" rate whereas a value of "5" is a "fast" rate. In some embodiments, a value of "1" is a "fast" rate whereas a value of "5" is a "fast" rate. The fluid pressure of the fluid exiting the plurality of fluid nozzles of oral insert 112 is higher in the "fast" rate than in the "slow" rate. In some embodiments, plug 116 is optional and oral care device 100 is battery powered.

Figure 2:
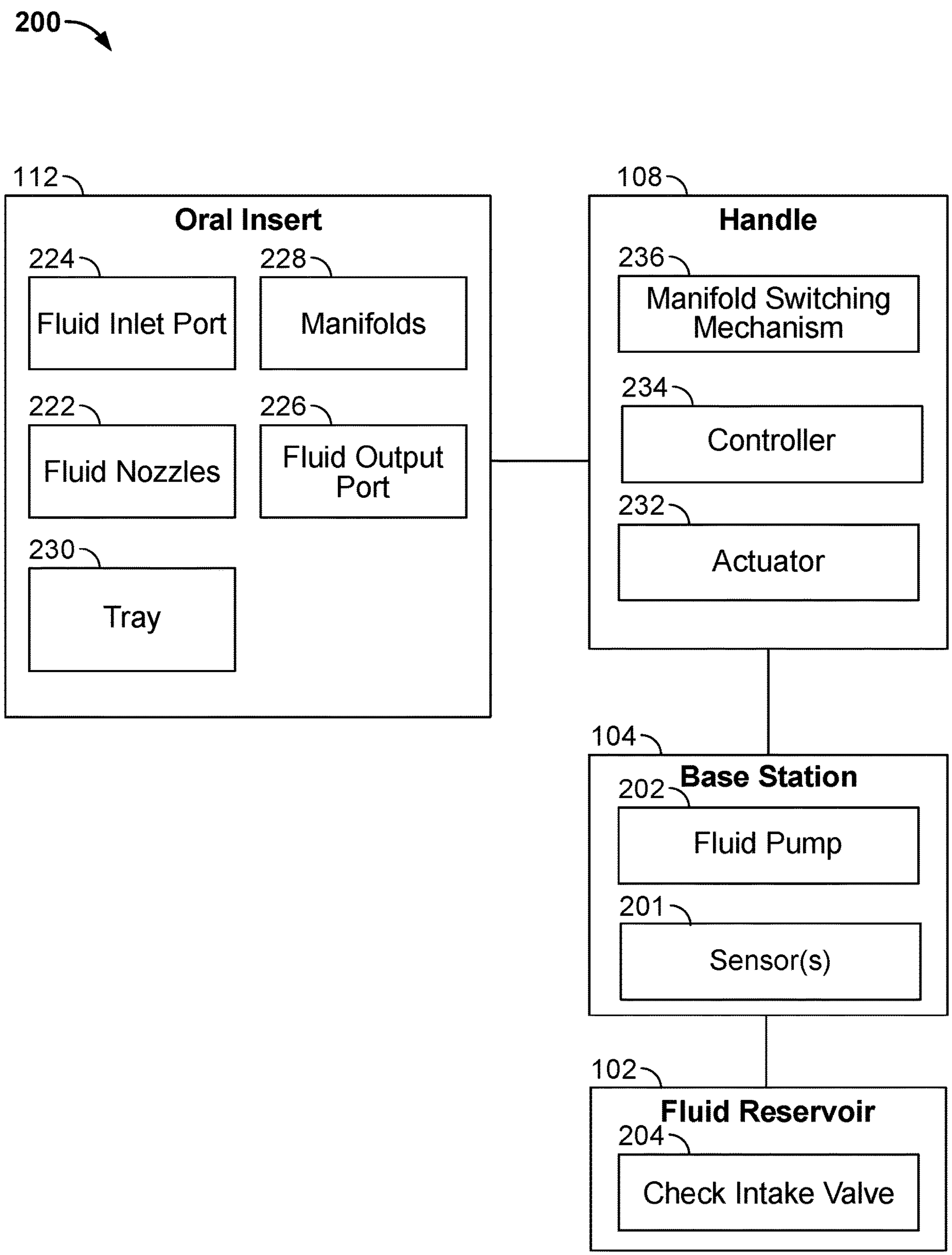
FIG. 2 is a block diagram of an oral care device in accordance with some embodiments.

FIG. 2 is a block diagram of an oral care device in accordance with some embodiments. Device 200 includes an oral insert 112 coupled to a fluid delivery system comprised of handle 108, fluid reservoir 102, and base station 104. Fluid reservoir 102 is releasably engaged to a base station 104. Base station 104 is releasably engaged to handle 108. Handle 108 is releasably engaged to oral insert 112.

Fluid reservoir 102 includes a check intake valve 204. In some embodiments, check intake valve 204 is located off-centered from a bottom surface of fluid reservoir 102. In some embodiments, check intake valve 204 is located at a center of the bottom surface of fluid reservoir 102.

Base station 104 includes fluid pump 202. Fluid pump 202 is configured to output pressurized fluid from fluid reservoir 102 to oral insert 112 via handle 108. Fluid pump 202 is configured to output pressurized fluid such that a flow rate of the pressurized fluid at each of the fluid nozzles 202 is the same flow rate within a predetermined tolerance. To provide an oral care treatment having a particular efficacy, fluid pump 202 is configured to provide a particular flow rate of fluid having a particular amount of pressure. The pressure of the fluid provided by fluid pump 202 may be controlled by a user adjusting flow control 114. In some embodiment, base station 104 includes one or more sensors 201. Handle 108 may also include one or more of the sensors 201. In some embodiments, the one or more sensors 201 include a fluid level sensor (e.g., optical level sensor, ultrasonic level, liquid level sensor, capacitive level sensor, etc.) configured to detect a volume of fluid in or remaining in fluid reservoir 102. In some embodiments, the one or more sensors 201 include a flow sensor. The flow sensor outputs a value indicative of the fluid flowing in the oral care device. An output value associated with the flow sensor is utilized by the controller to determine whether there is still fluid in the fluid reservoir (e.g., a sensor value below a threshold value indicates the fluid reservoir is empty.). In some embodiments, the one or more sensors 201 include a back pressure sensor. The back pressure sensor may be a pressure gauge, a flow meter, a manometer, etc. An output from the back pressure sensor may indicate back pressure in the fluid being provided by oral insert 112 (a restriction of the fluid flow outputted by the fluid nozzles due to oral insert 112 being filled with fluid). Controller 234 is configured to utilize the output from the back pressure sensor to determine whether to turn off/on fluid pump 202.

In some embodiments, base station 104 includes a slider switch to switch between a pump "on" mode (e.g., the pump is on the entire time of a cleaning cycle) and a pump "on-off" cycle mode (e.g., the pump alternates between being on and off during the cleaning cycle).

Handle 104 includes actuator 232. In response to user engaging with actuator 232, oral care device 200 activates and causes controller 234 to provide a control signal to fluid pump 202. The actuator may be a push-button actuator, a toggle button actuator, a rotary actuator, a slide actuator, a capacitive touch actuator, etc. In some embodiments, actuator 232 is located on base station 104. In some embodiments, the control signal has a duty cycle. In some embodiments, the duty cycle is periodic. In some embodiments, the duty cycle is aperiodic. In some embodiments, the control signal is a square wave. Other control signals may be implemented, such as a sine wave, a triangle wave, a sawtooth wave, a pulse wave, a rectangular wave, etc. A voltage associated with a first portion of the duty cycle is greater than the voltage associated with a second portion of the duty cycle. In some embodiments, the voltage associated with the second portion of the duty cycle is 0 V. In some embodiments, the voltage associated with the second portion of the duty cycle is a non-zero voltage. In some embodiments, the duty cycle is 50%. In some embodiments, the duty cycle is less than 50%. In some embodiments, the duty cycle is greater than 50%. In some embodiments, an inactive phase of the duty cycle occurs in the control signal based on an output value of the sensor. In some embodiments, an active phase of the duty cycle to provide a current portion of the fluid occurs in the control signal when some or all of a previously provided portion of the fluid has drained from the oral insert In some embodiments, the oral care device is activated as long as the user keeps pressing the actuator. In some embodiments, the oral care device is activated in response to the user engaging with the actuator and will continue to operate until it determines that there is no more fluid in the fluid reservoir. In some embodiments, the oral care device is activated for a particular amount of time in response to the user engaging with the actuator. The particular amount of time may vary depending on what pressure setting is selected via dial 106.

Handle 108 includes manifold switching mechanism 236. In some embodiments, manifold switching mechanism 236 includes a motor, a planetary gear carrier, a manifold selector disc, a low friction material, and a manifold disc. The manifold selector disc is coupled to the planetary gear carrier. Controller 234 is configured to provide a second control signal to the motor, which causes the sun gear of the planetary gear carrier to rotate. The gears of the planetary gear carrier are configured to rotate when the sun gear rotates. As a result, the manifold selector disc also rotates. The rate at which the manifold selector disc rotates is based on a gear ratio associated with the planetary gear carrier and rotational speed of the motor.

In some embodiments, manifold switching mechanism 236 includes a plurality of vanes, a hydraulic turbine, a manifold selector disc, a low friction material, and a manifold disc. The manifold selector disc is coupled to the hydraulic turbine. As fluid enters the handle, the plurality of vanes cause the fluid to move in a particular direction. In some embodiments, the fluid moves in a clockwise direction. In some embodiments, the fluid moves in a counter-clockwise direction. The movement of the fluid causes the hydraulic turbine and the manifold selector disc to rotate.

In some embodiments, the manifold switching mechanism 236 causes the manifold selector disc to rotate 14 times per second.

The manifold disc is comprised of a plurality of holes. The plurality of holes is arranged in a circular pattern. In some embodiments, the plurality of holes is arranged in a different pattern. The holes may be a circle, rectangle, triangle, or other type of shape. Each hole corresponds to one of the manifolds 228 of oral insert 112. The manifold disc selector includes an opening having a shape and dimensions such that when one of the holes of the manifold disc is selected (fully visible), the other non-selected holes of the manifold disc are not visible from the opening. Fluid is provided from fluid reservoir 102 to one of the manifolds 228 via the selected hole of the manifold disc. The configuration of the manifold switching mechanism 236 may prevent fluid from accidentally being introduced into the other manifolds via the other non-selected holes. The pressurized fluid causes a force to be applied on the manifold selector disc in a direction towards the manifold disc. A low friction material is situated between the manifold disc and the manifold selector disc. The low friction material reduces friction between the manifold disc and the manifold selector disc, and enables the manifold switching mechanism to rotate the manifold selector disc.

The fluid structures defined by the oral insert 112 may comprise a fluid inlet port 224, a set of manifolds 228, a set of fluid nozzles 222, and a fluid outlet port (e.g., effluence conduit) 226. The oral insert 112 includes a tray 230 configured to retain teeth (e.g., upper teeth, lower teeth). The tray 230 may be configured such that at least a portion of the tray 230 corresponds to a shape of the user's teeth.

Figure 12:
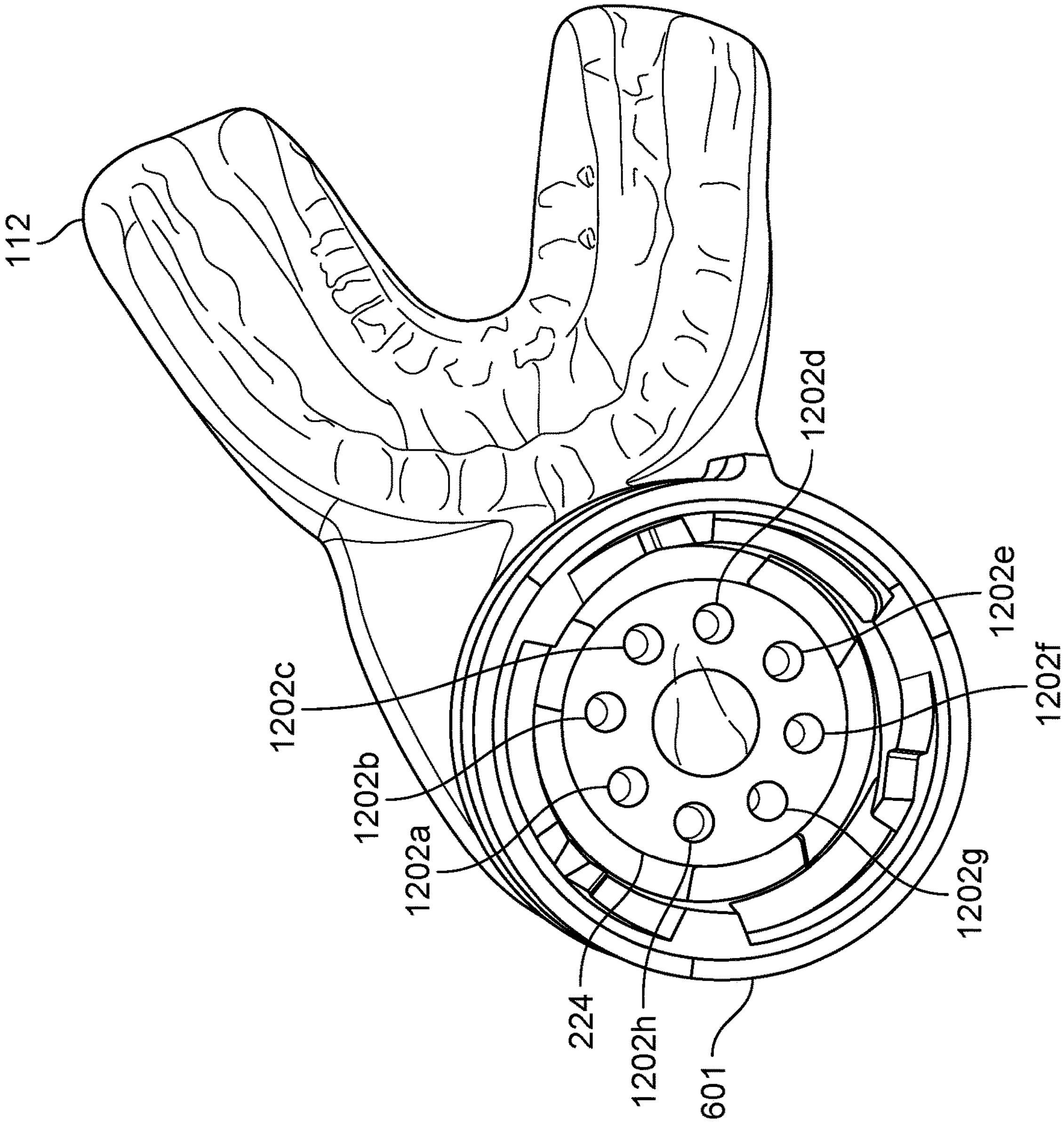
FIG. 12 illustrates an oral insert in accordance with some embodiments.

Oral insert 112 is configured to receive fluid from the handle 108 at fluid inlet port 224. Fluid inlet port 224 includes a plurality of manifold openings. Each manifold opening corresponding to one of the manifolds 228. FIG. 12 illustrates manifold openings 1202*a*, 1202*b*, 1202*c*, 1202*d*, 1202*e*, 1202*f*, 1202*g*, 1202*h*. Although oral insert 112 includes eight manifold openings, oral insert may include a different number of manifold openings and corresponding manifolds. Each manifold is associated with a corresponding set of fluid nozzles. Fluid output from the set of nozzles 222 may be directed at the user's oral anatomy, for example, through the interproximal spaces between the teeth. A nozzle may be positioned at any location on a manifold. In some embodiments, the nozzle position is specific to the oral structure of a user. In some embodiments, the nozzle position is preconfigured for an oral insert based on the size of the oral insert (e.g., small, medium, large, etc.).

After the fluid passes through and/or irrigates the user's oral anatomy, the fluid is then guided to the fluid outlet port 226 to exit the user's oral cavity. While the fluid is draining from oral insert 112 via the fluid outlet port 226, controller 234 sends a control signal to the fluid pump 202 to turn off for a particular duration (e.g., 0.5 seconds) and then a second control signal to turn back on for a particular amount of time. The particular duration ensures the fluid is almost or completely removed from oral insert 112. The manifold selector disc of manifold switching mechanism 236 continues to rotate while pump 202 is turned off. When fluid pump 202 turns back on, the fluid pressure of the fluid impacting the user's teeth and gums increases because it does not need to travel through fluid before reaching the user's teeth and gums. Fluid pump 202 is repeatedly turned on and off until fluid reservoir 102 is emptied or a particular amount of time elapses. This improves the efficacy of oral care device 200 because the fluid pressure of the fluid impacting the user's teeth and gums is maintained at a higher fluid pressure throughout a cleaning cycle when compared with the fluid pressure of the fluid impacting the user's teeth and gums when pump 202 is on the entire time during the cleaning cycle.

Figure 3:
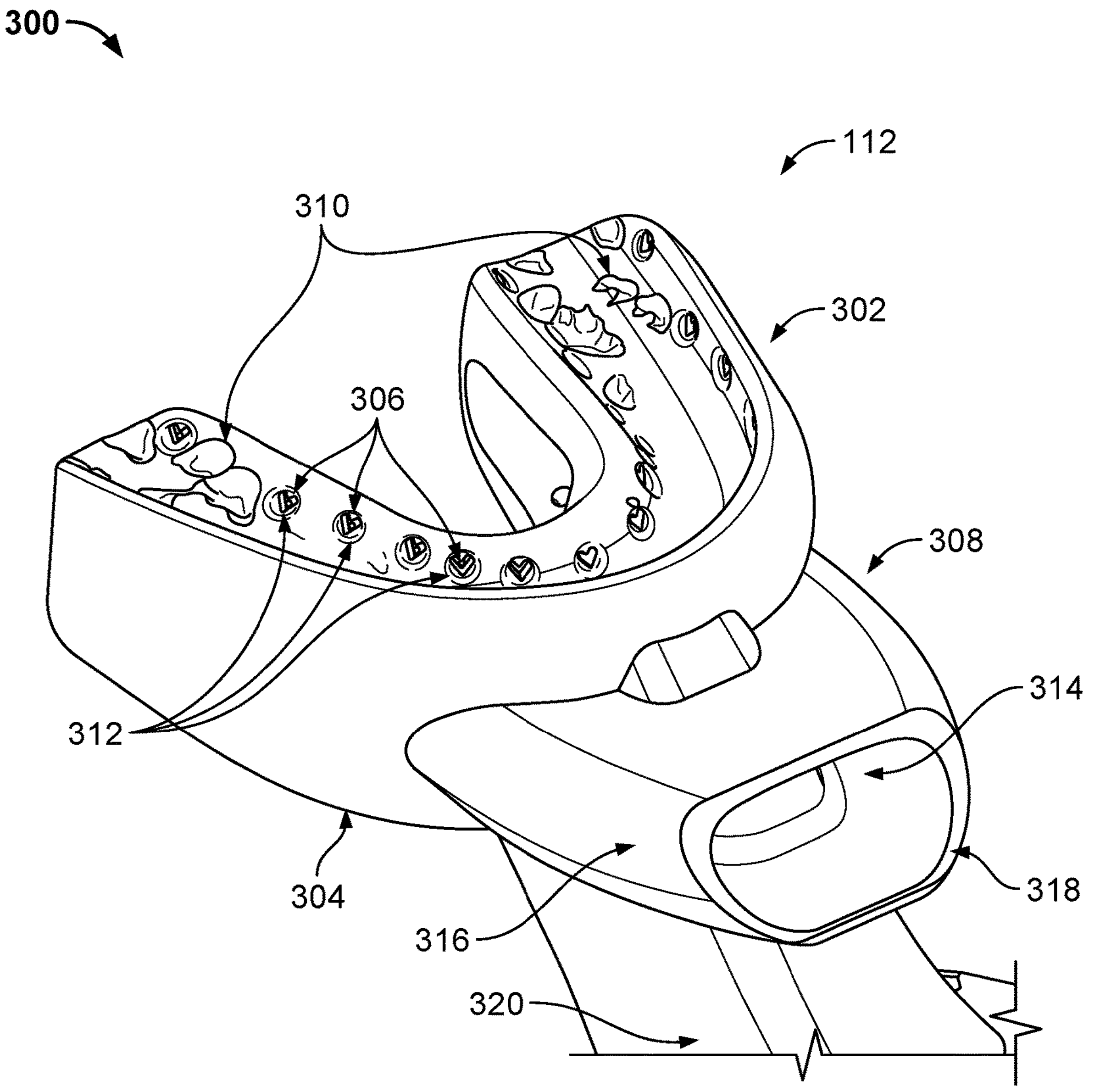
FIG. 3 illustrates an oral insert in accordance with some embodiments.

FIG. 3 illustrates an oral insert in accordance with some embodiments. In the example shown, oral insert 112 may be made of a rigid material, and may comprise an upper portion 302 having a tray configured to receive a user's upper teeth, a lower portion 304 having a tray configured to receive a user's lower teeth, a plurality of fluid nozzles 306 located in the upper portion and the lower portion, and an effluence conduit 308 located between the upper portion and the lower portion. The trays of the upper and lower portions may comprise one or more alignment features 310, which may comprise protrusions, slots, or recesses that receive and/or articulate with the user's teeth, gums, hard palate, soft palate, other oral structures, and/or may have contours that correspond to one or more teeth. These alignment features may help to ensure that the oral insert is seated in a desired position in the user's mouth. In some variations, one or more of the fluid nozzles 306 may be located in recesses or indentations 312 along the teeth- and/or gingiva-facing surfaces of the upper and lower trays. The recesses 312 and the fluid nozzles 306 may be located at regions of the upper and lower trays that correspond with the interproximal spaces between the user's teeth, and/or at locations that allow the fluid nozzles to direct fluid jets to the interproximal spaces (e.g., that may not necessarily correspond with the locations of the interproximal spaces). The recesses 312 may have a flared or tapered shape, and/or may have one or more concave contours, where the fluid nozzle opening is located at the narrow portion of the recess. The width of the recess may increase as it extends outward from the fluid nozzle opening. The increased width of a flared recess may allow the fluid jet spray to expand unimpeded. In some variations, the central axis of the flared recess may be aligned with the direction of the fluid jet. The effluence conduit 308 may comprise a central port or channel 314 which may extend between a posterior region and anterior region of the oral insert, and may protrude forward at the anterior region as a beak or an elongated spout 316 that terminates at a fluid egress opening 318. The fluid exiting the central port or channel 314 may be provided to a sink or other collection device (e.g., a collector for microbiomes). The central port or channel 314 is configured to have a minimum cross-section area that causes the fluid outputted from effluence conduit 308 to have a particular pressure. The minimum cross-section area is needed to prevent a high back-pressure that would cause discomfort for the user (e.g., a choking feeling) when using oral insert 112. In some embodiments, the particular pressure is 0.05 psi±a threshold pressure. Effluence conduit 308 comprises a first side fluid cavity or channel and a second side fluid cavity or channel. The side fluid cavities funnel into central port 314. The shape, sizing, and surface contours of effluence conduit 308 may be configured according to the user's oral anatomy (e.g., size and size of oral cavity, location of teeth, etc.) and configured to promote fluid dynamic efficiency in draining the fluid from the user's mouth. In some variations, the fluid delivered to the user's mouth may be pressurized and/or delivered at a high fluid rate in order to effectively clean their teeth and/or dislodge particles trapped in the interproximal spaces. Because of the increased rate and/or pressure of fluid flow into the oral cavity (i.e., fluid ingress), effluence conduit 308 may be sized and shaped to allow for fluid egress at the same or greater rate as fluid ingress. The oral insert 112 may also comprise one or more fluid manifolds, which may be a series of branched and/or networked internal fluid channels that distribute the fluid from the handle to the individual fluid nozzles. The fluid manifolds may terminate at a series of manifold openings in a manifold connector port 320 of the oral insert. In some variations, the manifold connector may have one opening per fluid manifold, or may have more than one manifold opening per fluid manifold. When oral insert 112 is connected to the handle, the fluid regulator components may be configured to fluidically engage with the manifold connector such that the fluid regulator controls the fluid flow into the manifolds.

FIGS. 4A-4D depict a fluid effluence conduit for an oral insert in accordance with some embodiments. In the example shown, oral insert 112 comprise a fluid effluence conduit 402 that is configured to direct fluid from a posterior region 404 of the oral insert (which would be seated in a posterior or lingual region of the oral cavity) to an anterior region 408 of the oral insert (which would be located in an anterior or facial region of the oral cavity). Oral insert 112 may be made of a rigid material, and it should be understood that the oral insert 112 may be used with or without an optional conformable and/or elastomeric substrate. The effluence conduit 402 may comprise a central channel 410 and two lateral channels 412*a*, 412*b* that are in fluid communication with the central channel 410. Alternatively, a fluid effluence conduit may comprise a single central channel or port that extends between the posterior region 404 and the anterior region 408 of the oral insert 400. The central channel 410 may comprise an anterior protrusion portion 414 that extends from the curved trough regions 416 of the oral insert that are configured to receive the user's teeth. In some variations, the entire central channel 410 may protrude from the trough regions 416. The central channel may be U-shaped such that each side of the U-shape is in communication with one of the lateral channels 412*a*, 412*b*. The internal wall of the central channel 410 may comprise one or more centrally-directed curves to merge fluid flow toward the mid-line or center of the mouthpiece. In some variations, the cross-sectional profile of the effluence conduit may be an oblong shape with a relatively low height-to-width ratio so that the user does not have to open their mouth uncomfortably wide in order to insert the mouthpiece, while having a sufficient cross-sectional fluid flow area to permit egress of a relatively large fluid ingress during an oral cleaning session.

In some embodiments, the lateral fluid cavity may comprise regions of varying size and geometry. For example, the lateral fluid cavities or channels 412*a*, 412*b* may each have a posterior swept section 426*a*, 426*b* that has a substantially constant cross-sectional geometry, and an anterior lofted section 428*a*, 428*b* that has a cross-sectional geometry that gradually increases in size toward the anterior region of the oral insert. For example, the width of the anterior lofted section 428*a*, 428*b* may gradually increase toward the anterior region of the oral insert. The anterior lofted section may also comprise centrally-directed contours 430*a*, 430*b* to direct fluid flow toward the central channel 410.

Figure 4A:
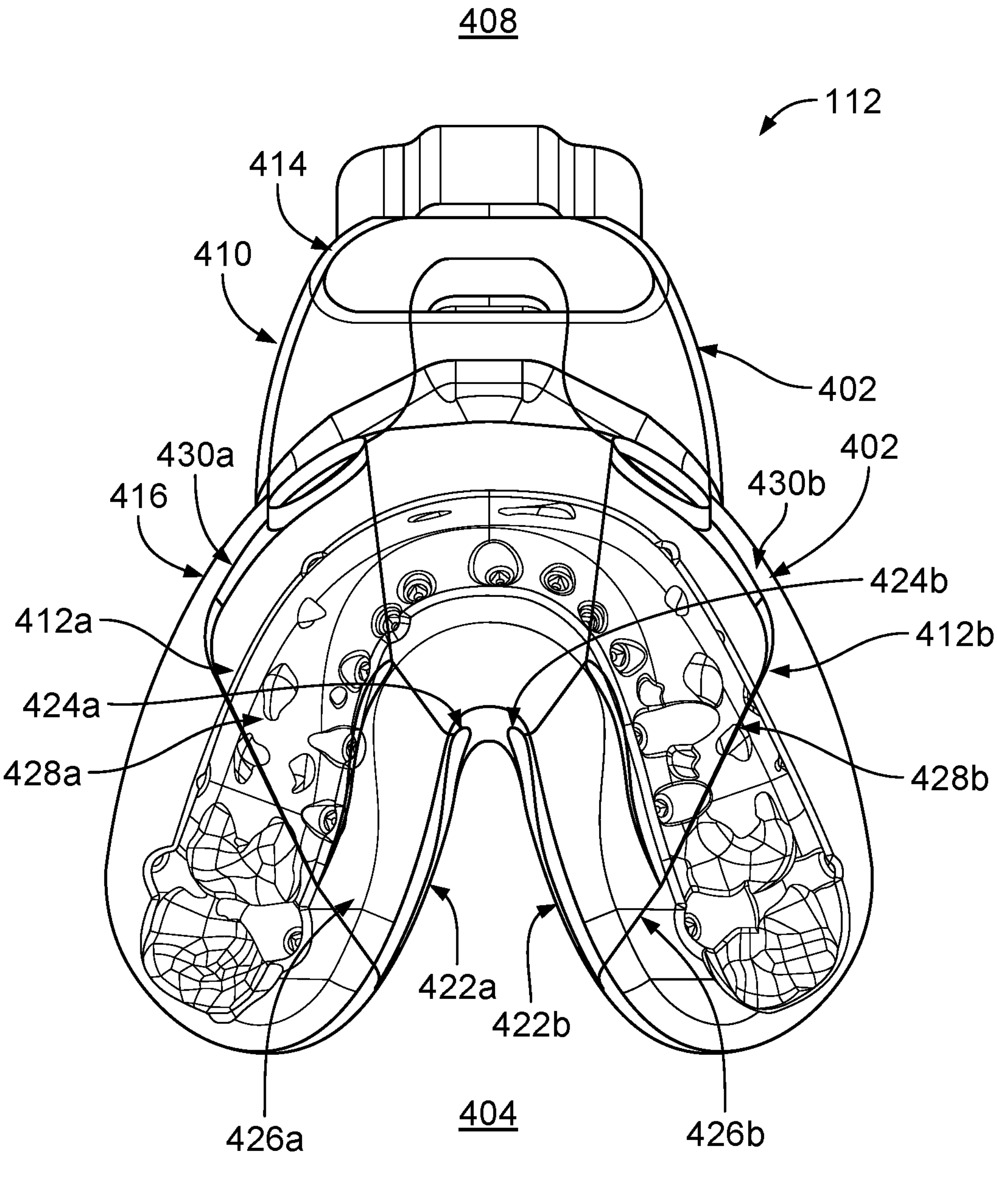
FIGS. 4A-4C depict a fluid effluence conduit for an oral insert in accordance with some embodiments.
Figure 4B:
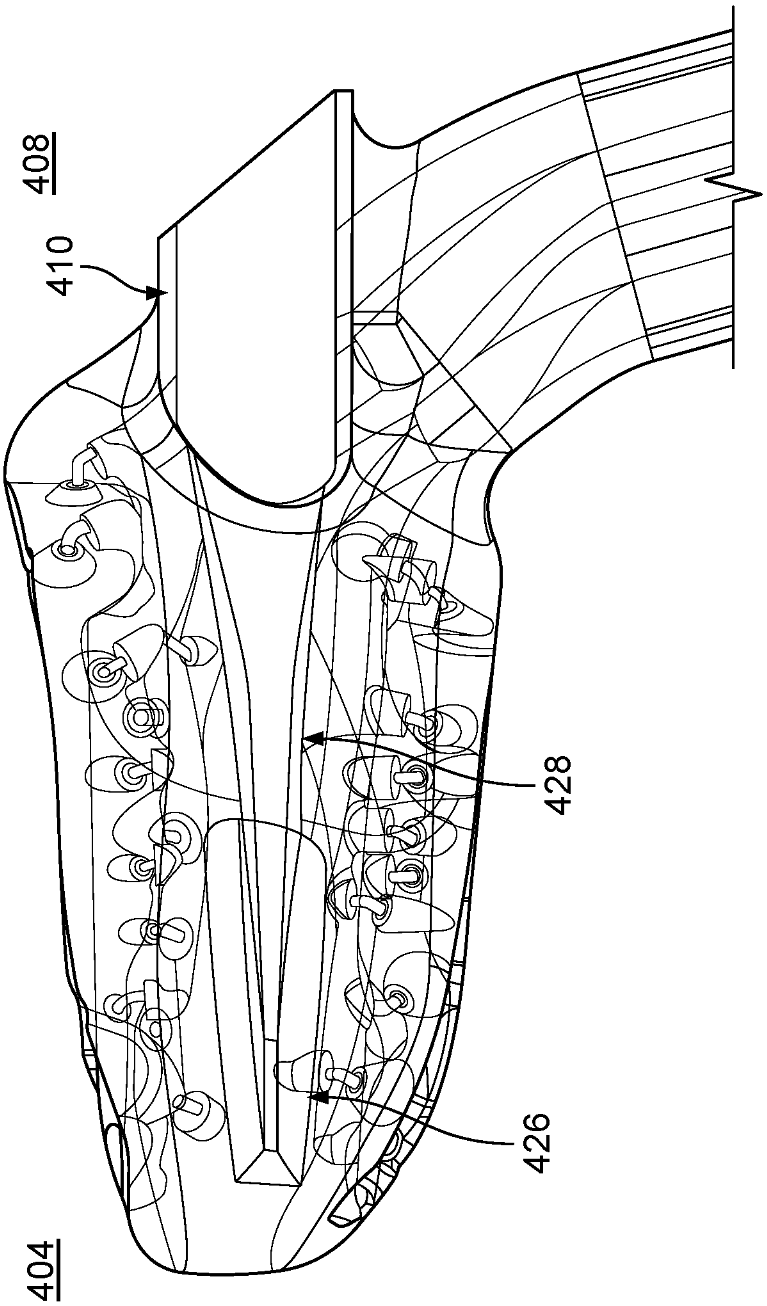

FIG. 4B depicts a side view of the oral insert of FIG. 4A. The fluid effluence conduit 402 is located between the upper (maxillary) portion and lower (mandibular) portion of the oral insert. This may promote the drainage of fluid from the fluid nozzles of the upper and lower portions of the oral insert into the lateral fluid channels of the effluence conduit. The overall height of the effluence conduit 402 increases from the posterior region 404 to the anterior region 408, as the fluid streams are combined together toward or within the central channel 410.

Figure 4C:
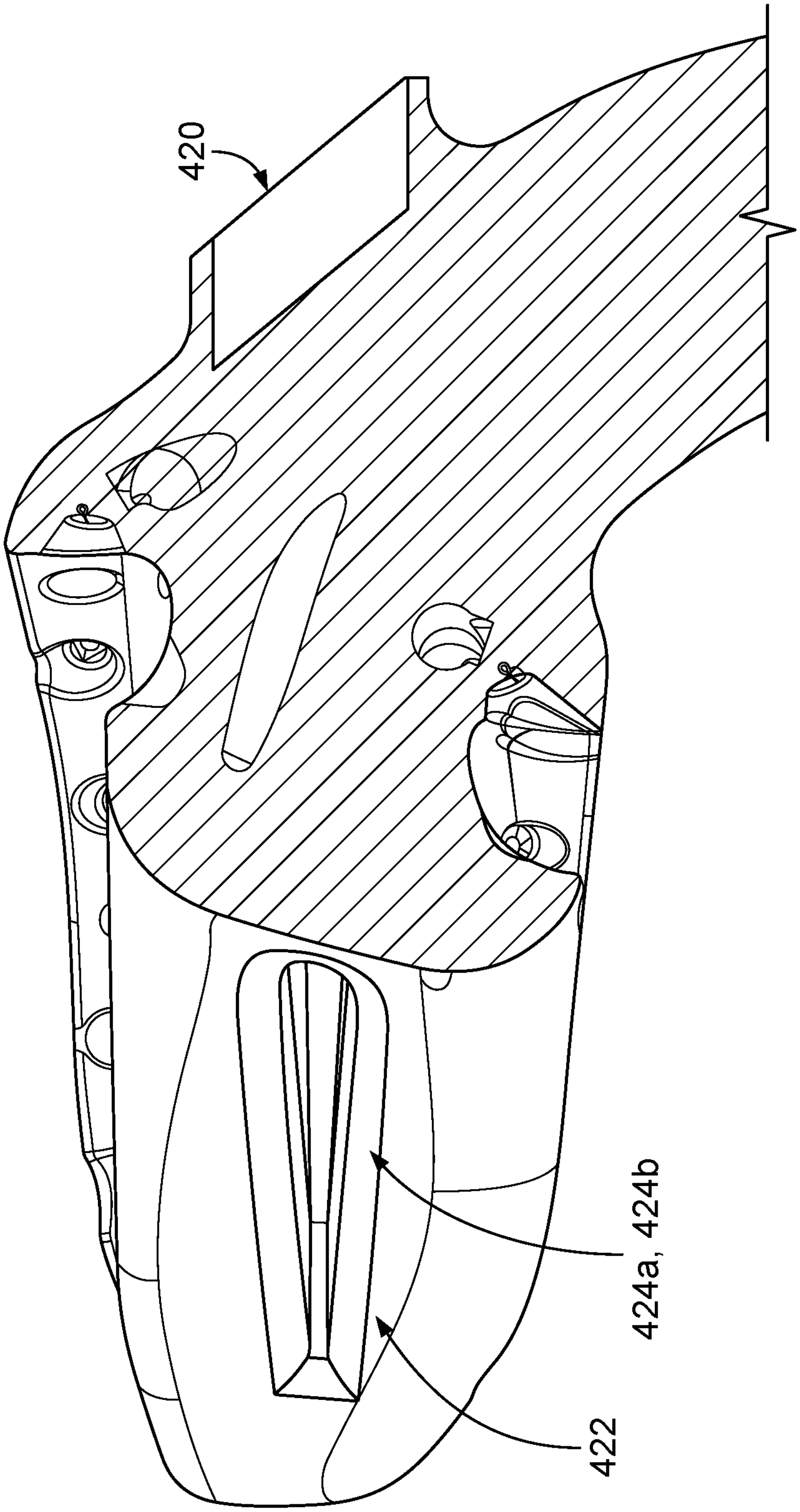

The central channel 410 may terminate at an anterior opening 420 and each of the lateral or side fluid cavities or channels 412*a*, 412*b* may be connected to a posterior opening 422*a*, 422*b*. The surface of the oral insert around the perimeter of the anterior opening and/or the posterior openings may have one or more concave or convex contours. For example, as depicted in FIGS. 4A and 4C, the perimeters of the posterior openings 422*a*, 422*b* may comprise one or more concave and/or convex contours that may help to ease or reduce the fluid pressure gradient (e.g., pressure drop) as fluid flows from the posterior oral cavity region into the posterior openings of the oral insert. In some variations, the perimeter of the posterior openings may be curved, where the curved lip 424*a*, 424*b* may facilitate the flow of fluid into the lateral fluid cavities or channels. The shape of the posterior openings 422*a*, 422*b* may also be selected to facilitate the flow of fluid into the lateral fluid cavities or channels. The posterior openings 422 has a tapered shape, where the region having the largest width (W1) is located toward the center of the oral insert and the region with the smallest with smallest width (W2) is located laterally.

Figure 5:
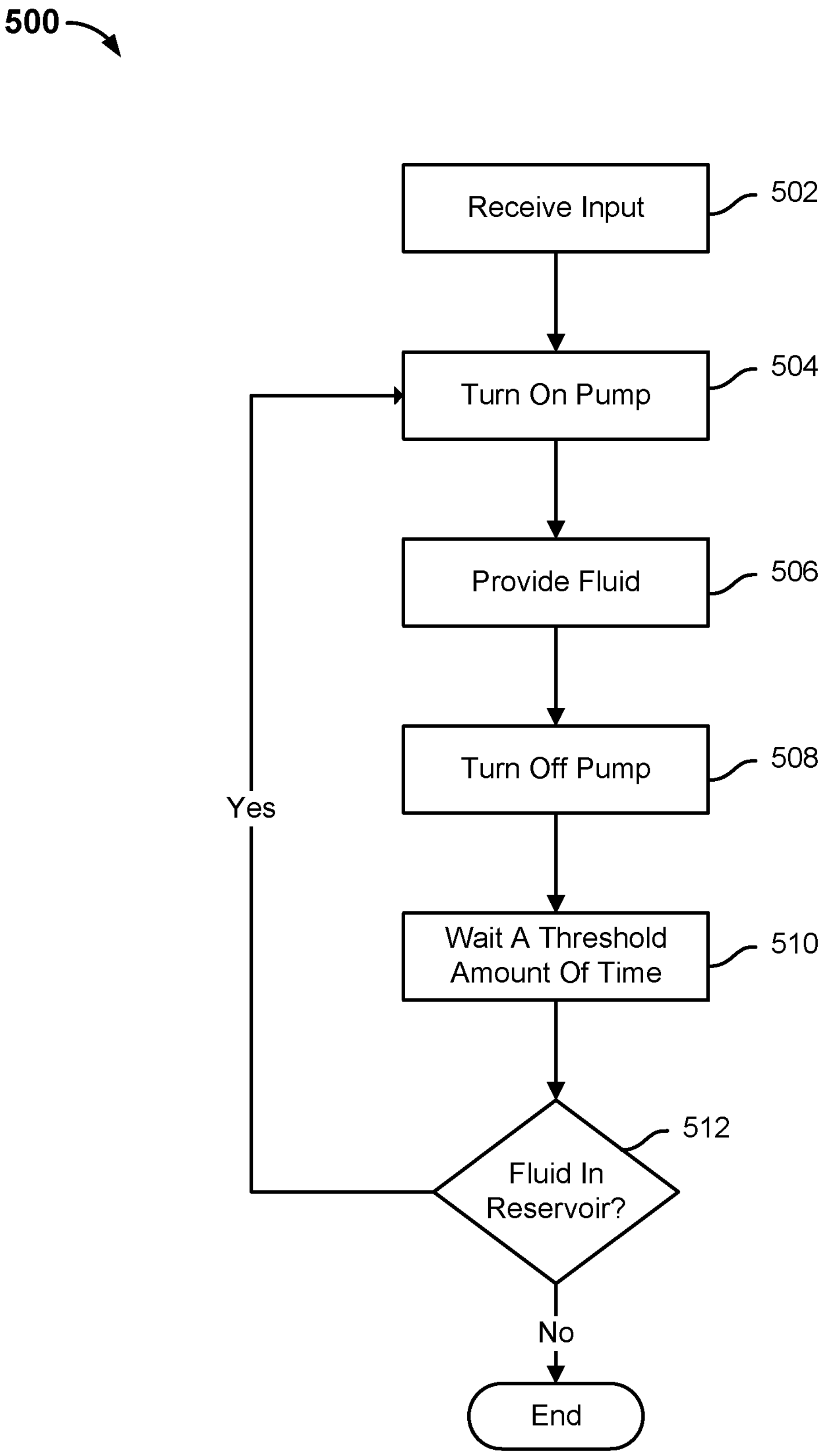
FIG. 5 is a flow diagram illustrating a process to operate an oral care device in accordance with some embodiments.

FIG. 5 is a flow diagram illustrating a process to operate an oral care device in accordance with some embodiments. In the example shown, process 500 may be implemented by a controller, such as controller 234.

At 502, an input is received. A user may engage an actuator to activate an oral care device. The actuator may be a push-button actuator, a toggle button actuator, a rotary actuator, a slide actuator, a capacitive touch actuator, etc.

At 504, the pump is turned on. In response to the received input, the controller provides a control signal to the pump. In response to receiving the control signal, the pump turns on and causes fluid to be provided from a fluid reservoir to an oral insert.

At 506, fluid is provided. The fluid travels from the fluid reservoir to the oral insert via a handle. The handle includes a manifold disc and a manifold selector disc. The manifold selector disc rotates while the oral care device is activated. In some embodiments, the manifold selector disc rotates in a clockwise direction. In some embodiments, the manifold selector disc rotates in a clockwise direction.

The manifold selector disc includes an opening. The opening has size and dimensions such that only one of the holes of the manifold disc is exposed when the manifold associated with the hole is selected. When transitioning between a first manifold and a second manifold, the opening is configured to expose a portion of a first hole of manifold disc corresponding to the first manifold and a portion of a second hole of manifold disc corresponding to the second manifold.

At 508, the pump is turned off. The pump is turned off after a particular amount of time has passed. In some embodiments, the control signal provided to the pump is a square wave. Other control signals may be provided to the pump, such as a sine wave, a triangle wave, a sawtooth wave, a pulse wave, a rectangular wave, etc. In some embodiments, the control signal is a periodic control signal. In some embodiments, the control signal is a non-periodic control signal.

The voltage provided to the pump at 504 is greater than the voltage provided to the pump at 508. In some embodiments, the voltage provided at 508 is 0 V. In some embodiments, the voltage provided to the pump is a non-zero voltage to reduce the pressure of the fluid outputted by the pump.

At 510, a threshold amount of time is waited. The threshold amount of time is based on the control signal. Fluid drains from the oral insert via an effluence conduit while the pump is off or in a reduced voltage state.

At 512, it is determined whether there is still fluid in the fluid reservoir. In some embodiments, it is determined whether there is still fluid in the fluid reservoir based on a timer. For example, a cleaning cycle for a fluid reservoir filled to line 103 and having a flow control value of "1" is expected to have a cleaning time of 15 seconds. A timer may begin to countdown in response to a user pressing actuator 110. The length of the time is based on a flow control value and an amount of fluid provided in the fluid reservoir.

In some embodiments, the base station includes a fluid level sensor to determine whether there is still fluid in the fluid reservoir. An output value associated with the fluid level sensor is utilized by the controller to determine whether there is still fluid in the fluid reservoir (e.g., depending on the configuration, a sensor value above or below a threshold value indicates the fluid reservoir is empty.).

In some embodiments, the oral care device includes a flow sensor. The flow sensor may be located in the handle or the base station. The flow sensor outputs a value indicative of the fluid flowing in the oral care device. An output value associated with the flow sensor is utilized by the controller to determine whether there is still fluid in the fluid reservoir (e.g., a sensor value below a threshold value indicates the fluid reservoir is empty.).

In response to a determination that there is still fluid in the fluid reservoir, process 500 returns to step 504. In response to a determination that there is not any more fluid in the fluid reservoir, process 500 ends.

Figure 6:
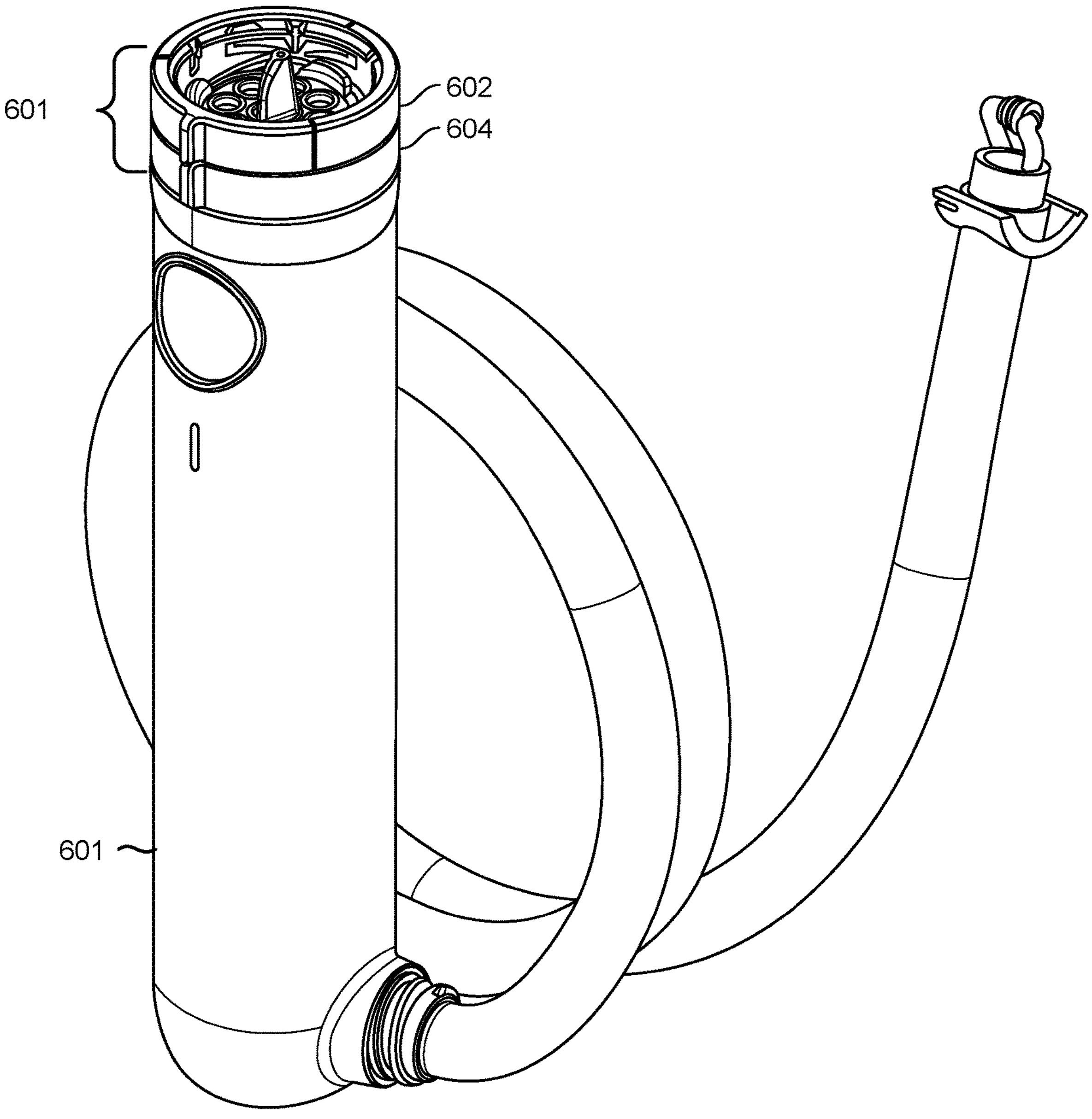
FIG. 6 is a diagram illustrating a handle in accordance with some embodiments.

FIG. 6 is a diagram illustrating a handle in accordance with some embodiments. In the example shown, handle 600 is coupled a seal 601 comprised of a handle portion 604 and a mouthpiece portion 602.

Figure 7:
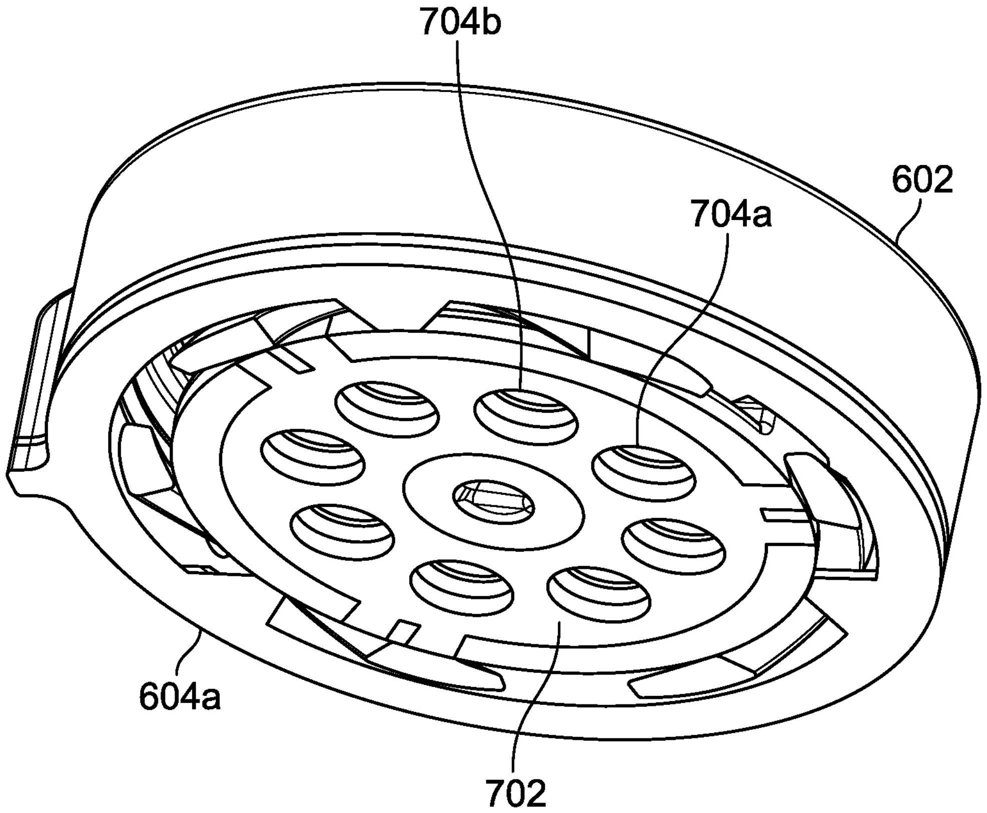
FIG. 7 is a diagram illustrating a first part of the handle portion of the seal in accordance with some embodiments.

FIG. 7 is a diagram illustrating a first part of the handle portion of the seal in accordance with some embodiments. In the example shown, the first portion 604*a* of the handle portion 604 includes a manifold disc 702 that includes a plurality of holes. Each of the plurality of holes is associated with a corresponding manifold of an oral insert.

In the example shown, manifold disc 702 includes eight holes, such as holes 704*a*, 704*b*. Oral insert 112 may include eight internal manifolds. Each of the internal manifolds of oral insert 112 is associated with one of the eight holes of manifold disc 702. In other embodiments, oral insert 112 includes a different number of internal manifolds and manifold disc 702 includes a different number of holes. In some embodiments, the number of internal manifolds is equal to the number of manifold disc holes. In some embodiments, the number of internal manifolds is different than the number of manifold disc holes. For example, two internal manifolds may share a manifold disc hole.

Figure 8A:
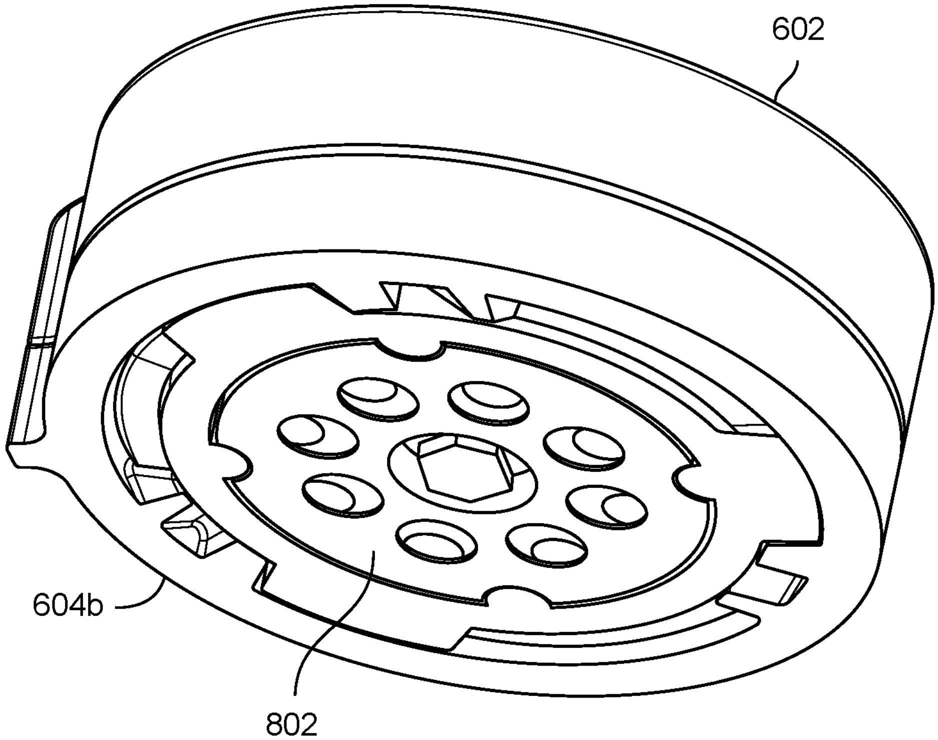
FIGS. 8A and 8B are diagrams illustrating a second part of the handle portion of the seal in accordance with some embodiments.
Figure 8B:
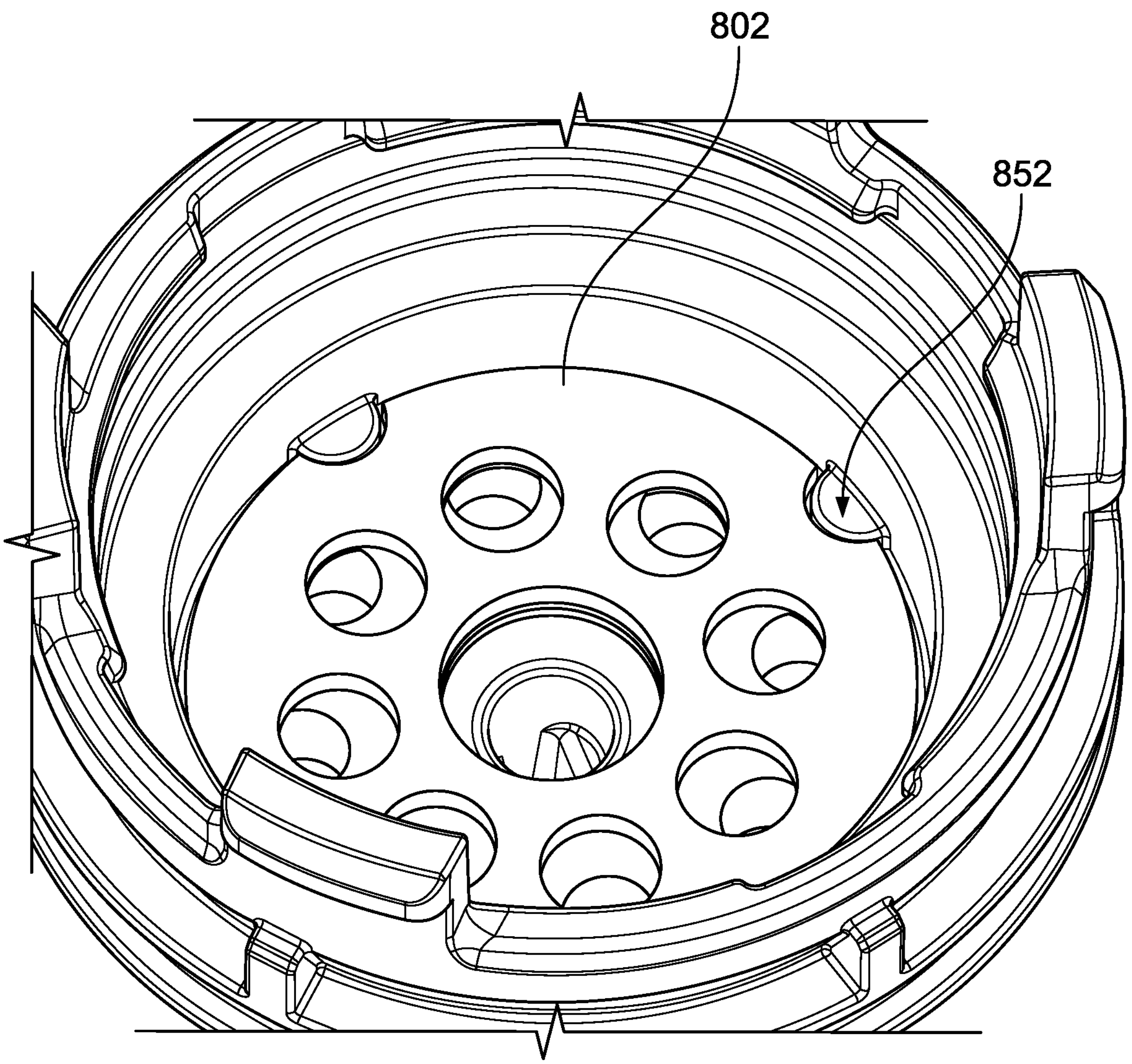

FIGS. 8A and 8B are diagrams illustrating a second part of the handle portion of the seal in accordance with some embodiments. In the example shown, the second portion 604*b* of the handle portion 604 includes a low friction material 802 (e.g., a material having a friction coefficient less than a threshold value). Examples of low friction material 802 include, but are not limited to, POM (Poly-OxyMethylene), POM-C (Acetal Copolymer), or POM-H (Delrin). The low friction material 802 includes the same number of holes as manifold disc 702. In the example shown, low friction material 802 also includes eight holes. In some embodiments, as seen in FIG. 8B, the low friction material 802 is held in place by one or more anti-rotation keys 852. The holes associated with low friction material 802 may become misaligned with the holes associated with manifold disc 802. This may restrict or block the flow of fluid through a selected hole associated with manifold disc 802. The one or more anti-rotation keys 852 may prevent a misalignment of low friction material 802 with manifold disc 702.

Figure 9:
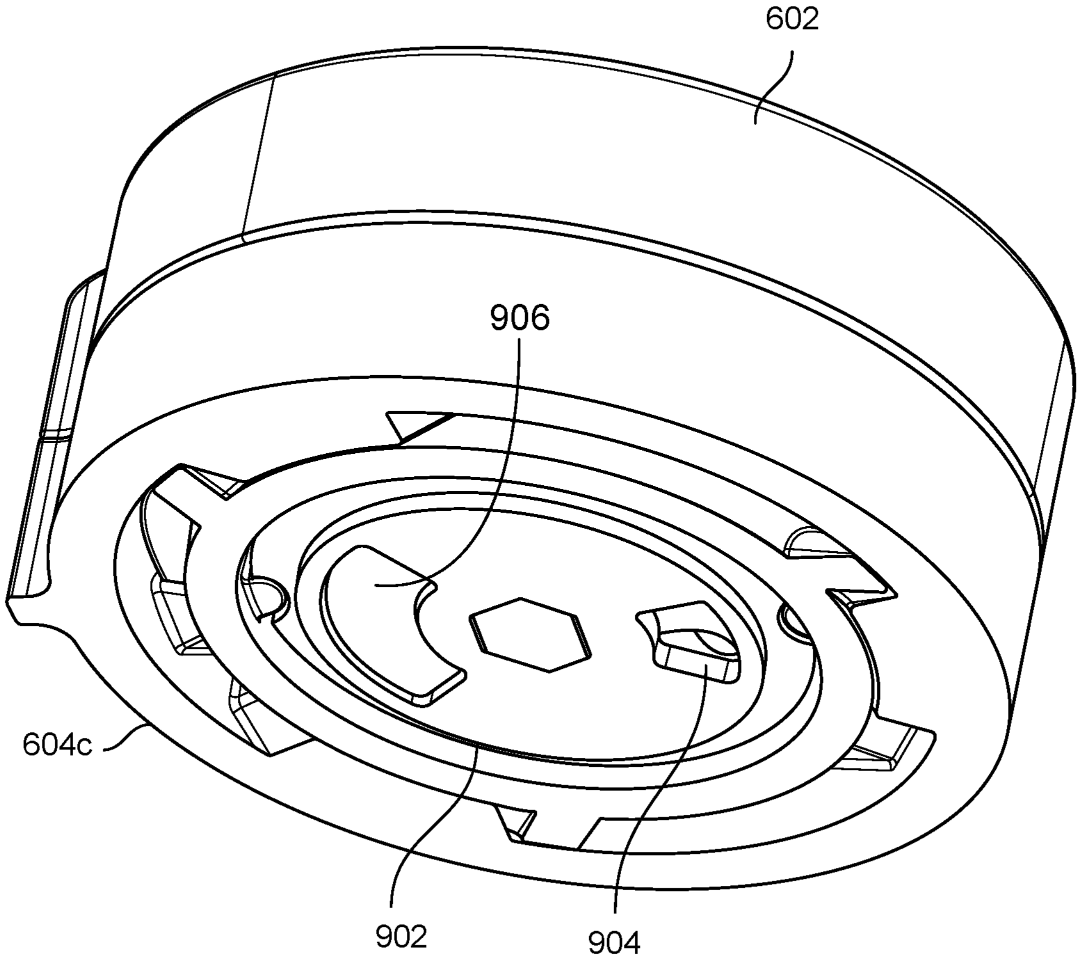
FIG. 9 is a diagram illustrating a third part of the handle portion of the seal in accordance with some embodiments.

FIG. 9 is a diagram illustrating a third part of the handle portion of the seal in accordance with some embodiments. In the example shown, the third portion 604*c* of the handle portion 604 includes a manifold selector disc 902. The manifold selector disc 902 includes an opening 904 (also referred to as a "gateway") and a rotation balancing cutout 906. In the example shown, opening 904 has a trapezoidal shape. Opening 904 may have other shapes. As seen in FIG. 10A, opening 904 has size and dimensions such that only one of the holes 704*b* of manifold disc 702 is exposed when the manifold associated with the hole is selected. When transitioning between a first manifold and a second manifold, as seen in FIG. 10B, opening 904 is configured to expose a portion of a first hole of manifold disc 702 corresponding to the first manifold and a portion of a second hole of manifold disc 702 corresponding to the second manifold.

Figure 11:
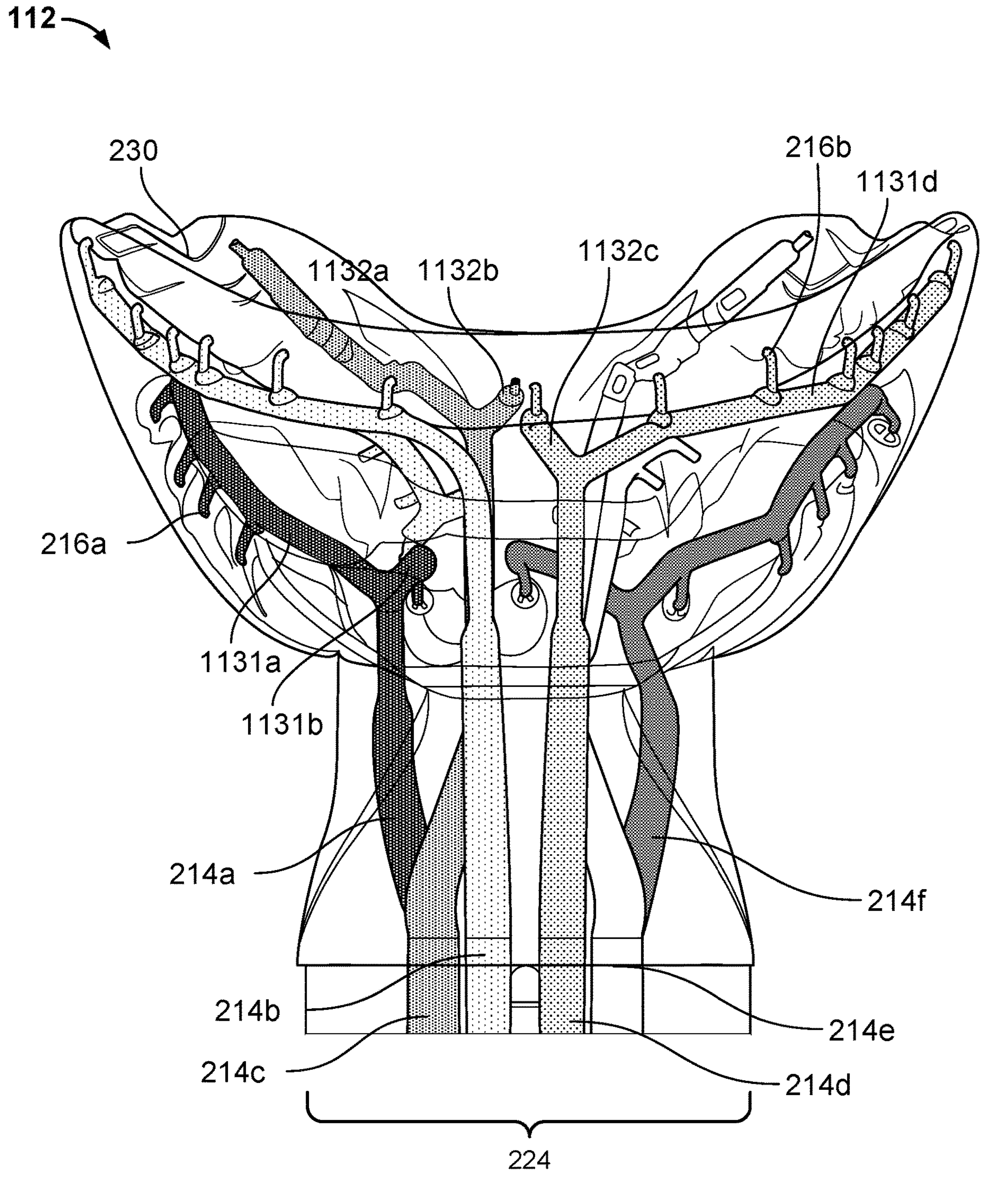
FIG. 11 depicts a schematic perspective view of a set of manifolds of an oral insert.

FIG. 11 depicts a schematic perspective view of a set of manifolds of an oral insert. The oral insert 112 may comprise a fluid inlet port 224 configured to receive fluid and a tray surface 230 configured to retain teeth (not shown). The set of manifolds 214*a*, 214*b*, 214*c*, 214*d*, 214*e*, 214*f* are configured to receive fluid from the fluid inlet port 224. Each manifold may comprise one or more trunks, such as trunks 1131*a*, 1131*b* and branches extending from a trunk, such as branches 1132*a*, 1132*b*, 1132*c*, 1132*d*. Fluid nozzles, such as fluid nozzles 216*a*, 216*b* may be coupled to respective trunks and branches. In some variations, the set of manifolds 214*a*, 214*b*, 214*c*, 214*d*, 214*e*, 214*f* may extend from the fluid inlet port 212 on either side of a lateral plane bisecting the central incisors (not shown).

FIG. 12 illustrates an oral insert in accordance with some embodiments. In the example shown, a fluid inlet port 224 of the oral insert 112 includes a plurality of manifold openings 1202*a*, 1202*b*, 1202*c*, 1202*d*, 1202*e*, 1202*f*, 1202*g*, 1202*h*. The plurality of openings is arranged in a circle. A manifold opening may be associated with one or more internal manifolds.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An oral care device, comprising:

an oral insert;

a pump;

a back pressure sensor;

an effluence conduit;

a fluid inlet port having a plurality of manifold openings;

a fluid reservoir; and a controller configured to provide a control signal having a duty cycle to the pump in response to an actuator being engaged and based on an output value from the back pressure sensor, wherein the output value from the back pressure sensor indicates whether the controller should turn on or turn off the pump and is indicative of back pressure in a fluid being provided by the oral insert due to the oral insert being filled with the fluid, wherein responsive to the control signal, the pump causes the fluid to be provided from the fluid reservoir to the oral insert according to the duty cycle via the fluid inlet port having the plurality of manifold openings, wherein the effluence conduit allows a previously provided portion of the fluid to drain from the oral insert, wherein an active phase of the duty cycle providing a current portion of the fluid occurs in the control signal when the output value of the back pressure sensor indicates that some or all of the previously provided portion of the fluid has drained from the oral insert via the effluence conduit and during an inactive phase of the duty cycle the some or all of the previously provided portion of the fluid is draining from the oral insert via the effluence conduit to a sink while the pump is off.

2. The oral care device of claim 1, wherein the actuator is a push-button actuator, a toggle button actuator, a rotary actuator, a slide actuator, or a capacitive touch actuator.

3. The oral care device of claim 1, wherein the actuator is located on a base that includes the pump.

4. The oral care device of claim 1, wherein the actuator is located on a handle that is coupled to the oral insert and a base.

5. The oral care device of claim 1, wherein the control signal is a square wave.

6. The oral care device of claim 1, wherein the control signal is a triangle wave.

7. The oral care device of claim 1, wherein the control signal is a rectangular wave.

8. The oral care device of claim 1, wherein the control signal is a sawtooth wave.

9. The oral care device of claim 1, wherein the control signal is periodic.

10. The oral care device of claim 1, wherein the control signal is aperiodic.

11. The oral care device of claim 1, further comprising a handle that includes a manifold disc selector and a manifold disc.

12. The oral care device of claim 11, wherein the manifold disc selector is configured to rotate while the oral care device is activated.

13. The oral care device of claim 12, wherein the manifold disc selector rotates in a clock-wise direction.

14. The oral care device of claim 13, wherein the duty cycle is greater than 50%.

15. The oral care device of claim 13, wherein the duty cycle is less than 50%.

16. The oral care device of claim 12, wherein the manifold disc selector rotates in a counter-clockwise direction.

17. The oral care device of claim 1, wherein the duty cycle is equal to 50%.

18. The oral care device of claim 1, wherein the oral insert includes a plurality of internal manifolds, each of the plurality of manifolds having a plurality of fluid nozzles.

19. The oral care device of claim 1, wherein the oral care device is active for an amount of time that is based on an amount of the fluid and a flow control value.

20. The oral care device of claim 1, wherein the inactive phase of the duty cycle occurs in the control signal based on the output value of the back pressure sensor.

21. The oral care device of claim 20, wherein the output value of the back pressure sensor indicates that the current portion of the fluid is traveling through the previously provided portion of the fluid before impacting teeth and/or gum associated with a user of the oral care device.

* * * * *